United States Patent
Van Den Brink et al.

(10) Patent No.: US 7,600,596 B2
(45) Date of Patent: Oct. 13, 2009

(54) TILTING VEHICLE

(75) Inventors: Christopher Ralph Van Den Brink, 'S-Gravendeel (NL); Hendrik Marinus Kroonen, Zwijndrecht (NL)

(73) Assignee: Brinks Westmaas B.V., Dordrecht (NL)

( * ) Notice: Subject to any disclaimer, the term of this patent is extended or adjusted under 35 U.S.C. 154(b) by 353 days.

(21) Appl. No.: 10/522,816

(22) PCT Filed: Jul. 31, 2003

(86) PCT No.: PCT/NL03/00551
§ 371 (c)(1),
(2), (4) Date: Sep. 22, 2005

(87) PCT Pub. No.: WO2004/011324
PCT Pub. Date: Feb. 5, 2004

(65) Prior Publication Data
US 2006/0097471 A1     May 11, 2006

(30) Foreign Application Priority Data
Jul. 31, 2002    (NL)   .................................. 1021195

(51) Int. Cl.
*B62D 61/06*     (2006.01)
(52) U.S. Cl. .................... 180/210; 180/41; 280/755; 280/124.103; 280/6.16
(58) Field of Classification Search ......... 180/210–217, 180/41, 282; 280/755, 124.103, 6.15, 6.154, 280/6.159, 6.16
See application file for complete search history.

(56) References Cited

U.S. PATENT DOCUMENTS

| | | | | |
|---|---|---|---|---|
| 3,746,118 A * | 7/1973 | Altorfer | ...................... | 180/210 |
| 4,064,957 A * | 12/1977 | Parham | ..................... | 180/215 |
| 4,088,199 A * | 5/1978 | Trautwein | ................... | 180/209 |
| 4,351,410 A * | 9/1982 | Townsend | ................... | 180/210 |
| 4,666,018 A * | 5/1987 | Shibuya | ...................... | 180/213 |
| 4,974,863 A * | 12/1990 | Patin | .......................... | 280/62 |
| 5,107,950 A * | 4/1992 | Horiike et al. | ............. | 180/219 |
| 5,116,069 A * | 5/1992 | Miller | ..................... | 280/5.509 |
| 5,857,535 A * | 1/1999 | Brooks | ........................ | 180/41 |
| 6,276,480 B1 * | 8/2001 | Aregger | ..................... | 180/213 |
| 6,328,125 B1 * | 12/2001 | Van Den Brink et al. | .... | 180/211 |
| 6,435,522 B1 * | 8/2002 | Van Den Brink et al. | . | 280/5.509 |
| 7,308,963 B2 * | 12/2007 | Patin et al. | .................. | 180/180 |

* cited by examiner

*Primary Examiner*—Ruth Ilan
(74) *Attorney, Agent, or Firm*—Young & Thompson

(57) ABSTRACT

A vehicle provided with at least three wheels, with a first frame part having at least two footboards, and a second frame part. The second frame part is connected to the first frame part in such a way that it can tilt about a tilting axis running in the longitudinal direction. The second frame part includes a control element and a driver's seat. A tilting member is connected to a first and second frame part, in order to exert a tilting force upon the second frame part on the basis of a control signal, a sensor being connected to the first frame part for measuring a force or moment exerted by a driver upon the first frame part and/or to determine a position of the rider relative to the footboard. The sensor is connected to the tilting member and feeds the control signal to the tilting member.

20 Claims, 16 Drawing Sheets

TILTING VEHICLE

The application relates to a vehicle provided with at least three wheels, with a first frame part that is provided with two footrest positions and a second frame part that is connected to the first frame part in such a way that it can tilt about a tilting axis extending in the longitudinal direction, said second frame part comprising a steering element and a driver's seat.

Such tilting vehicles are known from U.S. Pat. No. 4,088,199 and U.S. Pat. No. 4,325,565. These publications describe a three-wheeled tilting vehicle wherein the driver, when negotiating a bend, can tilt the driver's seat and the steering relative to the front wheels by exerting a force upon a footboard with his legs. When traveling slowly, or when there are external influences, such as side wind, the driver controls the tilt by means of his legs, and he can stabilize the driver's seat with his feet on the footboards as if he had his feet resting on the ground. The known tilting vehicles have the disadvantage that in some cases, such as when negotiating sharp bends, the rider can deliver insufficient force with his feet to keep the vehicle under control. Furthermore, when the driver is traveling along bendy roads or when prolonged disturbances occur, such as a constant side wind, the disadvantage occurs that the rider becomes fatigued.

It is therefore an object of the present invention to provide a tilting vehicle of the abovementioned type in the case of which a stable, safe and comfortable ride is obtained.

It is a further object of the present invention to provide a tilting vehicle wherein where there are bendy road parts sufficient tilting power can be delivered, and wherein fatigue symptoms in the rider are minimized.

To that end, the tilting vehicle according to the present invention is characterized in that a tilting member is connected to the first frame part and the second frame part, in order to exert a tilting force upon the second frame part on the basis of a control signal, a sensor being connected to the first frame part for the purpose of measuring a force or moment exerted by a driver upon the first frame part and/or to determine a position of the rider relative to the footboard, which sensor is connected on the other hand to the tilting member and feeds the control signal to the tilting member.

By means of the tilting member, such as, for example, a hydraulic cylinder, the force exerted by the rider between the tilting and non-tilting part is amplified, so that the tilting can take place with little effort. This means that a greater tilt can be obtained on sharp bends, so that the driver gains better control of the vehicle. Furthermore, driving with a constant side wind or when other disturbances occur, such as driving on a laterally sloping road surface, will not result in fatigue symptoms for the driver.

The footrest positions, by comparison with the first, non-tilting frame part, can comprise fixed footrests with a sufficiently large surface to act as footboards. A single footboard around the first frame part or a U-shaped support bracket around the first frame part can also be connected immovably to the latter. Owing to the relatively large surface of the footrest positions on the first frame part, the driver can, if necessary and/or if desired, move his feet quickly to a stable position in which the driver feels as if he were placing his feet for support on the road surface. The term "first frame part" as used here denotes an assembly of wheel(s), rods, pipes and footrests that are connected in such a way by means of mechanical, hydraulic and/or electromagnetic means that they function as a unit. The term "longitudinal direction" here denotes a direction defined by points on the front and rear side of the vehicle respectively. A tilting axis running in the longitudinal direction can have a vertical component, such as a tilting axis that forms an angle of, for example, 45° with the horizontal.

Furthermore, it can be a disadvantage for the driver that during driving as a motorcycle with the vehicle according to the invention, without having to exert appreciable force for the tilting, his feet always have to bend along with the tilt without any need to deliver a force. This can be uncomfortable during normal driving. In order to solve this problem, one embodiment of a tilting vehicle according to the invention is characterized in that the second frame part comprises two footrest positions. This makes it possible for the rider to put his feet down in several places, and the rider, when traveling at ease, can place his feet on the two sides of the tilting part, so that his whole body moves along with the tilt. Only when the rider stops or is performing special actions, does he place his feet on the footrest positions, such as on the footboard(s), again. This ensures that when the feet are placed on the front footrests what the feet do is very similar to what they do on an ordinary bicycle, moped or motorcycle, while when the feet are placed on the footboard(s) a stable position is achieved, as if the feet were resting on the road surface.

It is pointed out that a tilting vehicle with a first pair of footrests on the non-tilting part and a second set of footrests on the tilting part is known per se from JP-A-59227576. However, the known vehicle has the disadvantage that no additional power assistance is present, so that the tilting must be performed by the driver by way of footrests fixed on the fixed frame part. In this case these footrests are not in the form of footboards, so that the driver can easily slip off them, which can lead to unsafe situations. Furthermore, the driver will have more of a tendency, on removing his feet from the footrest connected to the tilting frame part, to place his feet on the ground, rather than on the narrow fixed footrests.

In an embodiment of the vehicle according to the invention, the tilting member exerts a force upon the second frame part that is opposed in direction to a force exerted by external circumstances upon the second frame part. An active and a passive variant can be distinguished here.

In a passive variant the tilting member, under the influence of the control signal generated by the sensor, exerts a force upon the second frame part that is directed in the opposite direction to and is smaller than the tilting force exerted by external factors upon the vehicle. These "external forces" can be a centrifugal force caused by a bend, the force of gravity that acts upon a tilted second frame part, side wind, impulse changes during lateral displacement and/or movements of the driver or fellow rider. The tilting member in the passive embodiment delivers a counterforce that is smaller than or equal to the external force, so that the second frame part is braked or damped, and causes no tilting movement against the external tilting force, so that energy/power is dissipated from the tilting part by the tilting device. The passive system is of a very simple design, is robust and is relatively cheap.

In an active variant the force of the tilting member is greater than the tilting force generated by the external factors, so that an active tilt is obtained, as a result of the control signal fed to the tilting member.

In a further embodiment the tilting member exerts a force upon the second frame part that is directed towards a first side of the vehicle, which first side lies opposite the side of the vehicle on which the footrest position of the first frame part on which a pushing force is exerted by the driver is situated.

When the driver during negotiation of a right-hand bend exerts a force upon, for example, the left footrest position, the tilting member will exert a force towards the right on the second frame part. In one variant of an embodiment that functions asymmetrically, the tilting member generates little or no force in the opposite direction, in this case towards the left, so that swinging of the second frame part to the left can proceed unimpeded.

In the case of the tilting vehicle the wheels of the first frame part, which can comprise two or more wheels—the plane of which wheels per se could tilt in a further variant of an embodiment—, remain in a relatively fixed position relative to the road surface. In this way the driver knows the position of the second, tilting frame part relative to the first frame part, and consequently relative to the carriageway. The first frame part comprises a part with a substantially constant position relative to the road surface, such as, for example, the footrest positions on the first frame part. These footrest positions can be situated at a virtually fixed distance of the wheels of the vehicle from a road surface, which distance can vary slightly as a result of suspension and shock absorbers, and by the fact that some sensors, in particular mechanical sensors based on spring force, need a slight movement to enable them to function.

As used in this case, the tilting member can comprise a hydraulic, pneumatic, electromagnetic or any other suitable drive. The sensor can be an electrical, mechanical, hydraulic or pneumatic type, or can be combinations of these.

In a further embodiment of the vehicle according to the invention each footboard is provided with a relatively narrow raised edge against which a rider can rest his foot in the lateral direction. The edge makes it possible for the rider to push hard against the footboard at any tilting angle, without his feet slipping. This enables the rider to keep a good feel of the tilted position and the position of the part not tilting along with it. The edge can be rounded off, so that the soles of the rider's feet can easily roll along the narrow edge and the ankles do not have to bend. The power assistance between the two vehicle parts according to the present invention does not have to function continuously, but according to one embodiment can work only at those times when it is required. In one embodiment the tilting member delivers a tilting force between the two parts that is directed in the opposite direction to a tilt caused by a driver. This produces an inbuilt safety feature, which ensures that if there are radical steering movements or the tilting part is released when the vehicle is stationary, for example when the driver is dismounting, the tilting part does not undergo an undesirably great tilting movement, such as, for example, that it falls over against the road surface. In one embodiment the control signal blocks the tilting member when a predetermined tilting position is reached. In such a case a freewheel must be present to enable the driver to place the tilting part upright again by his own effort.

The footrest positions or footboards on the first frame part in one variant of an embodiment can be foot-operated in order to give a signal that is fed by way of the sensor to the tilting member. Depressing the left-hand pedal when negotiating a right-hand bend results in a force by the tilting member to the right, and vice versa. To this end, the footrest positions can comprise a power-assisted and a non-power-assisted part. The footrest positions of the first frame part preferably lie further away from an axis of the vehicle than the footrest positions of the second frame part. If the rider moves his legs from the "narrow position" of the footrest positions on the second frame part to the "broad position" of the footrest positions on the first frame part, a stable, spread position of the legs is automatically assumed.

A further embodiment of a tilting vehicle has a blocking mechanism for locking the frame part in a tilted position or an upright position for locking the second frame part in a tilted position or an upright position in the case of a stationary vehicle, and a drive-off blocking mechanism wherein the vehicle cannot be driven off if the blocking mechanism is blocking the second frame part in a position other than the upright position.

When the vehicle is stationary the driver must lock the tilting part in order to prevent said part from tilting undesirably. However, when the vehicle is to be driven off the locking has to be removed again, in order to obtain a safe ride. The drive-off blocking mechanism prevents a blocked tilting vehicle from being driven off. Designing the drive-off blocking mechanism as a brake means that when the frame parts are locked a handbrake is automatically applied. This ensures that when the driver is parking the vehicle he does not forget to put on the handbrake.

A number of embodiments of a vehicle according to the present invention are all, by way of example, described in greater detail with reference to the appended drawing. In the drawing.

Figure 1:
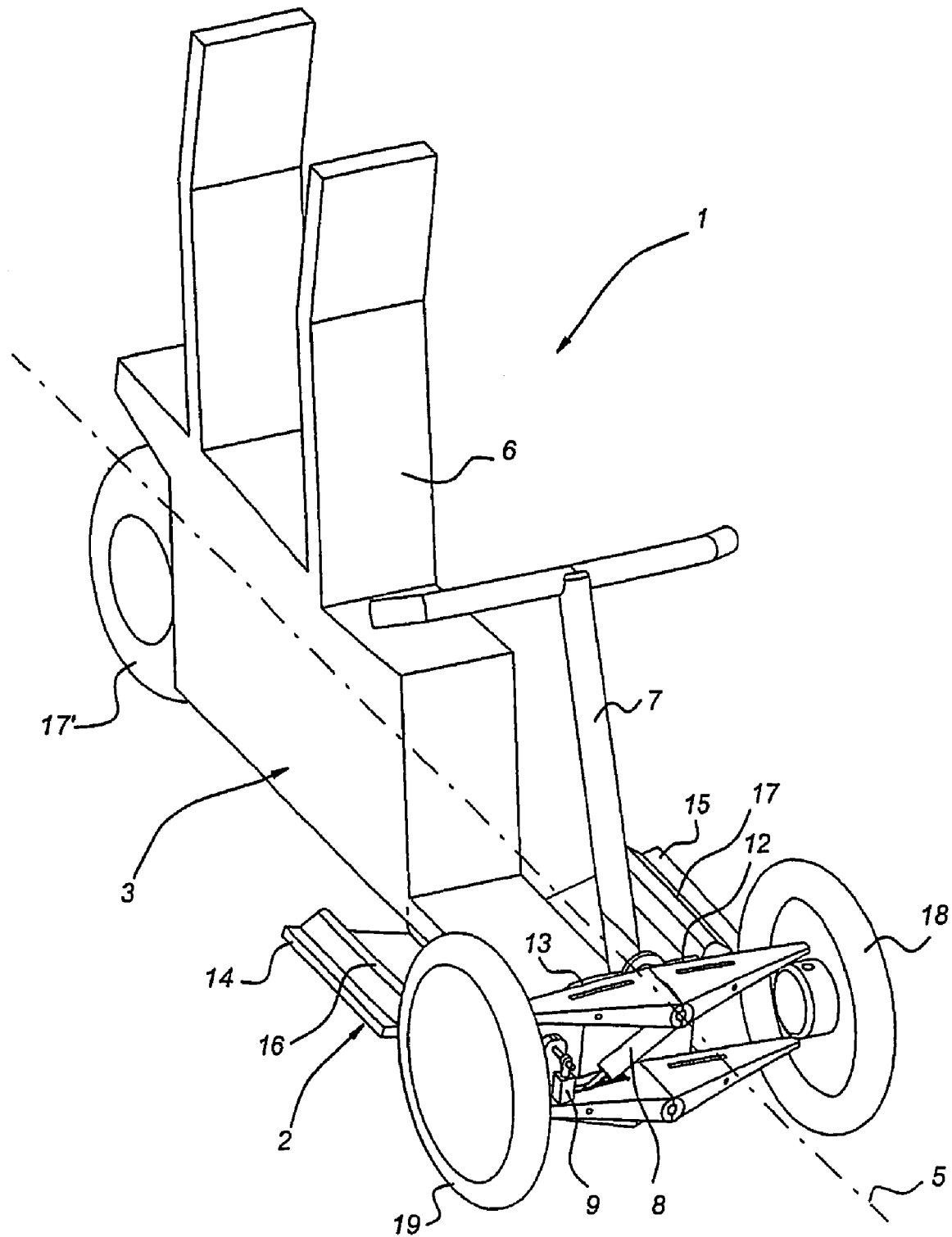
FIGS. 1-15 show a tilting vehicle according to the invention with two front wheels in different tilted positions.
Figure 2:
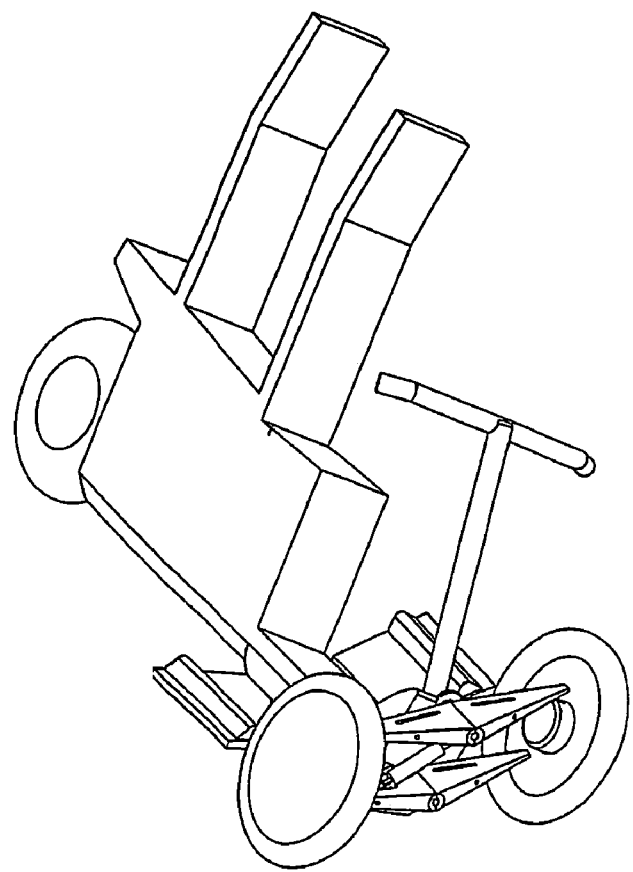
Figure 3:
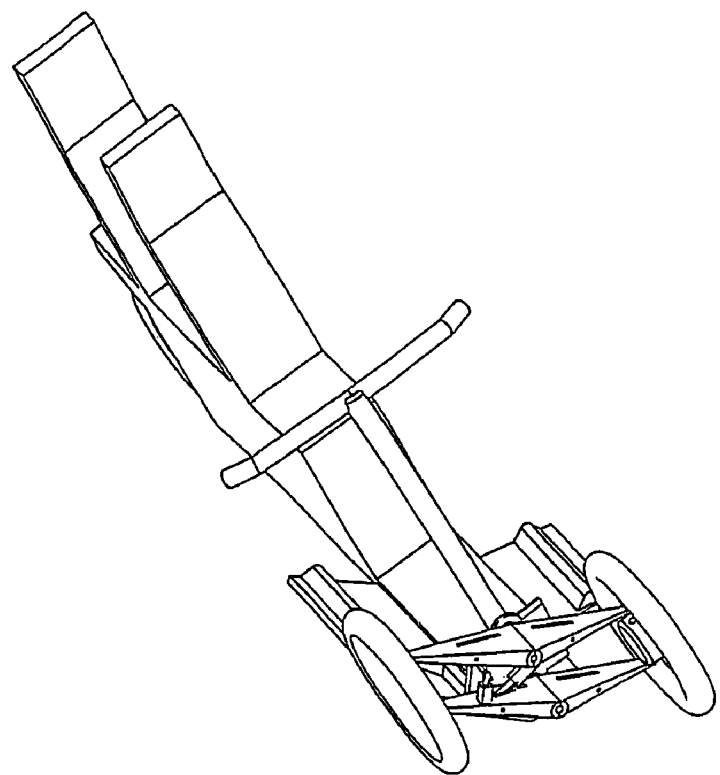
Figure 4:
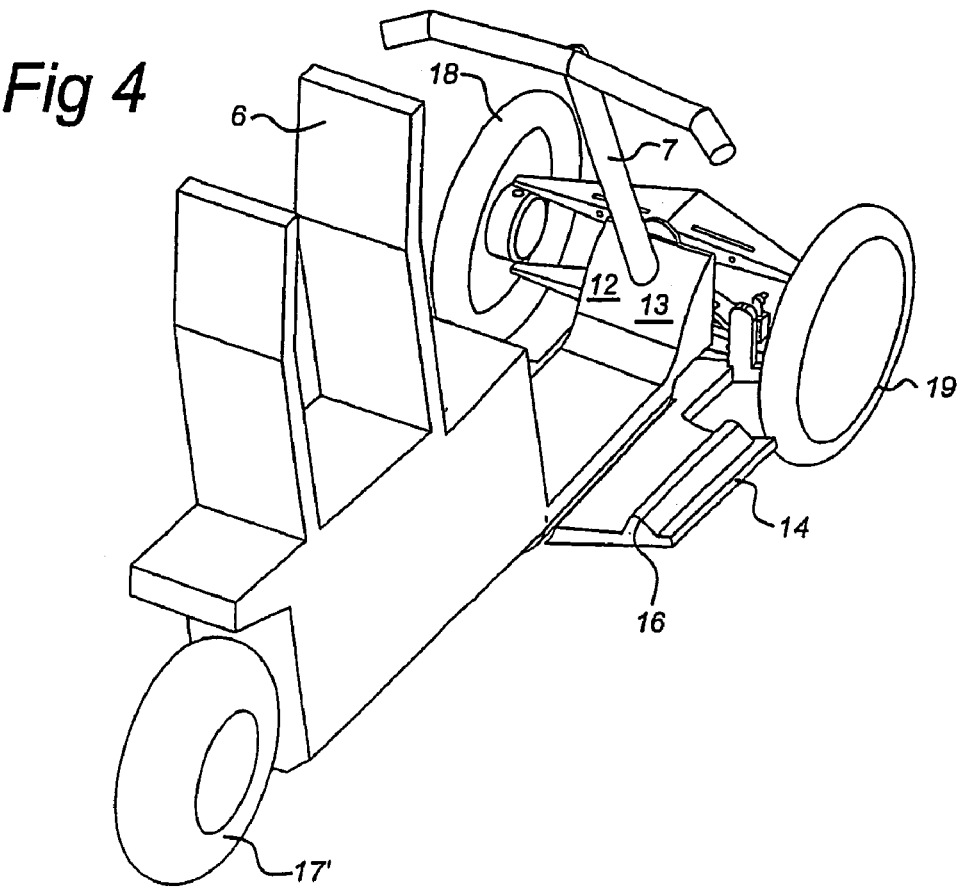
Figure 5:
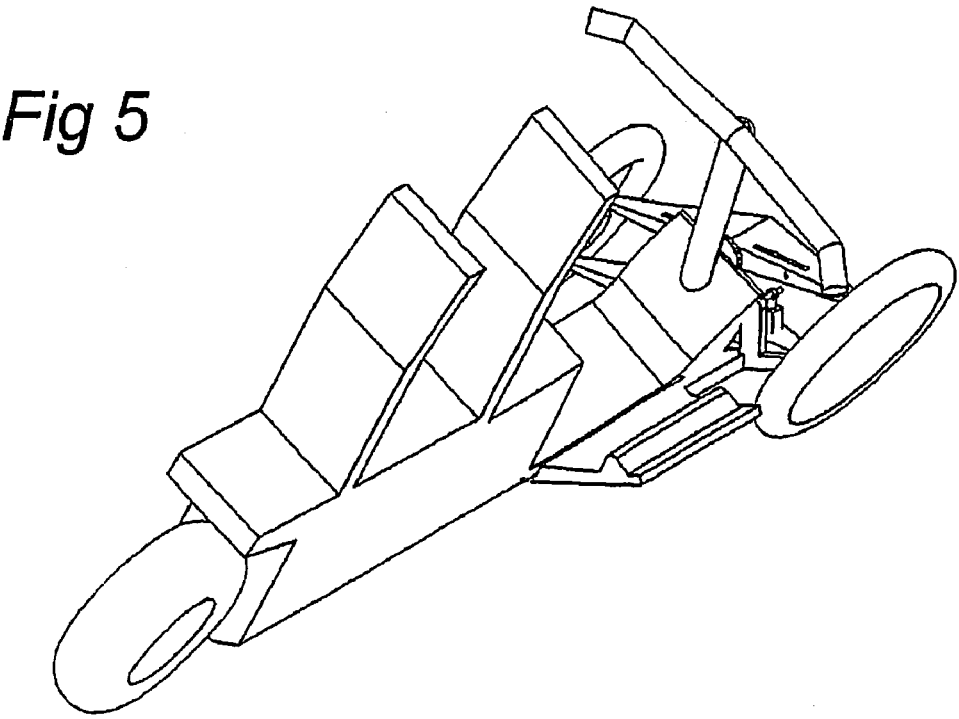
Figure 6:
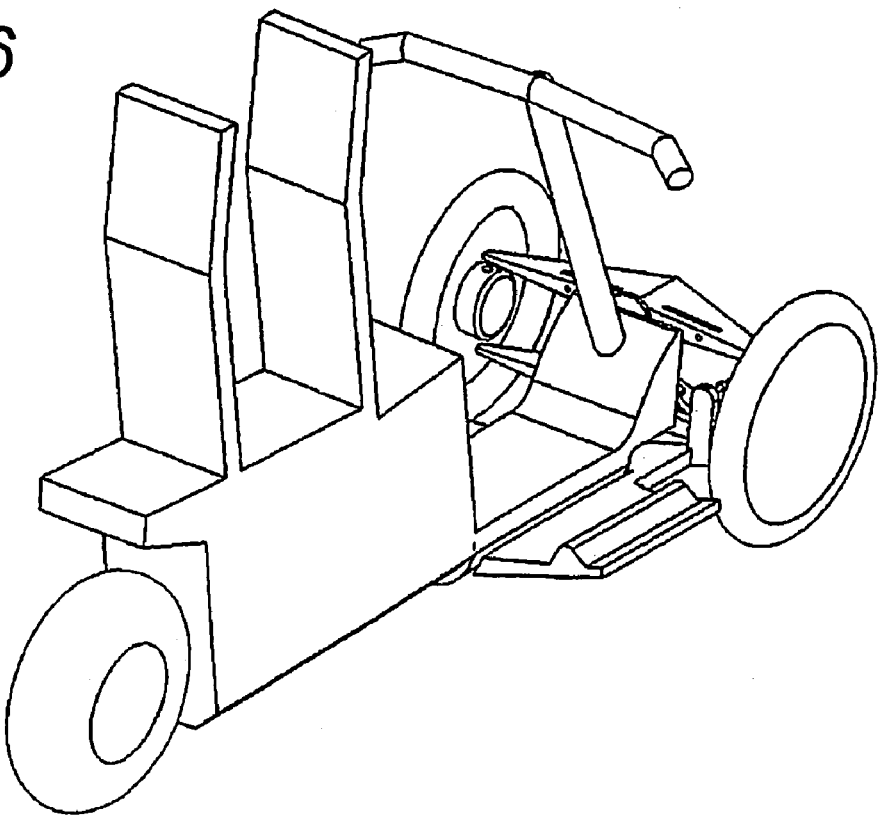
Figure 7:
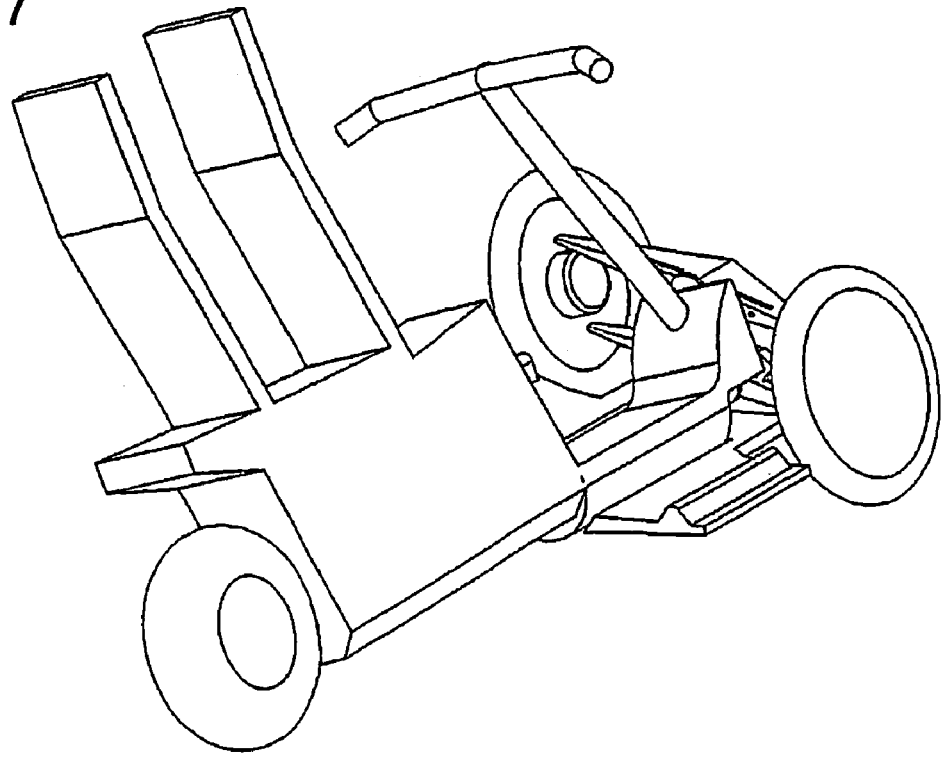
Figure 8:
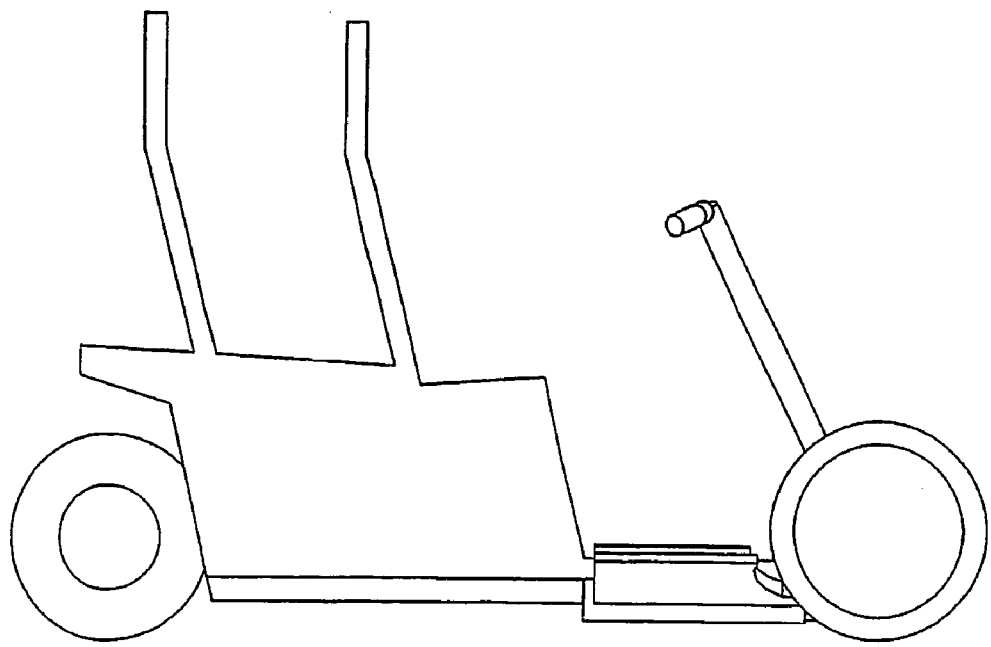
Figure 9:
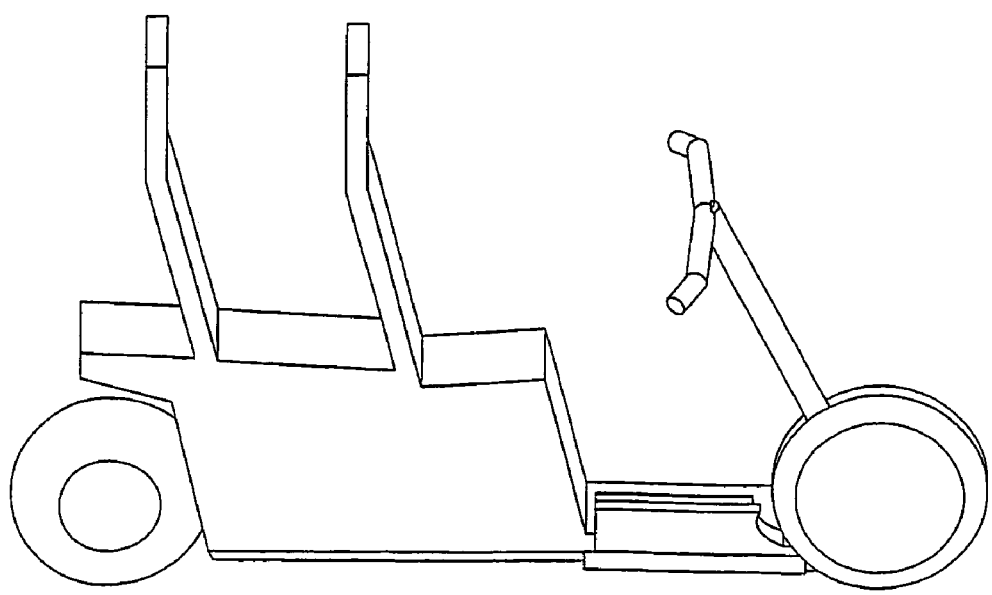
Figure 10:
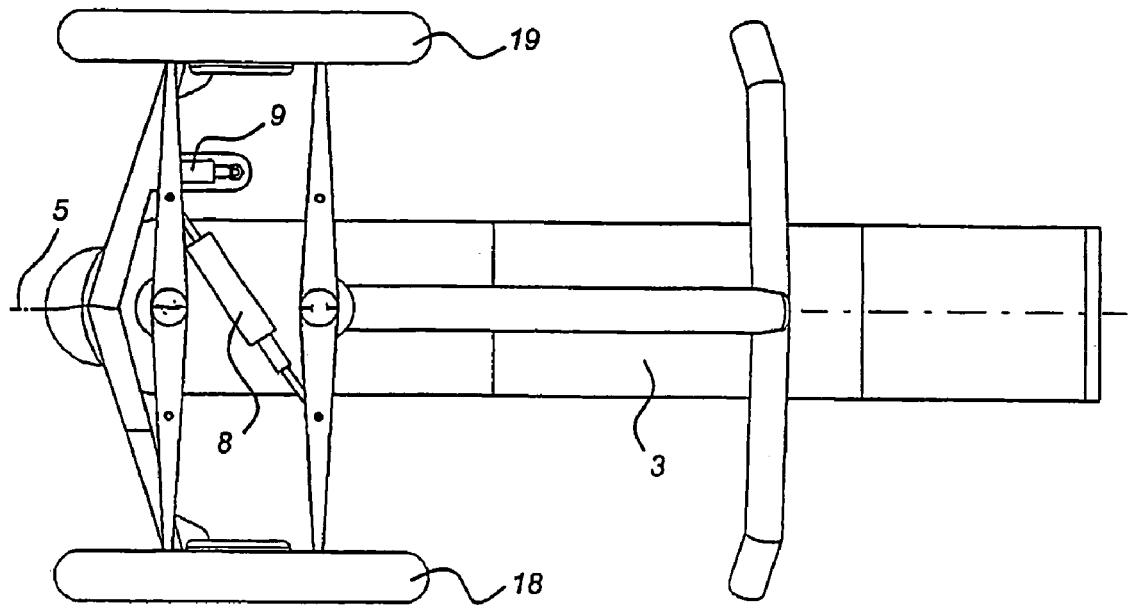
Figure 11:
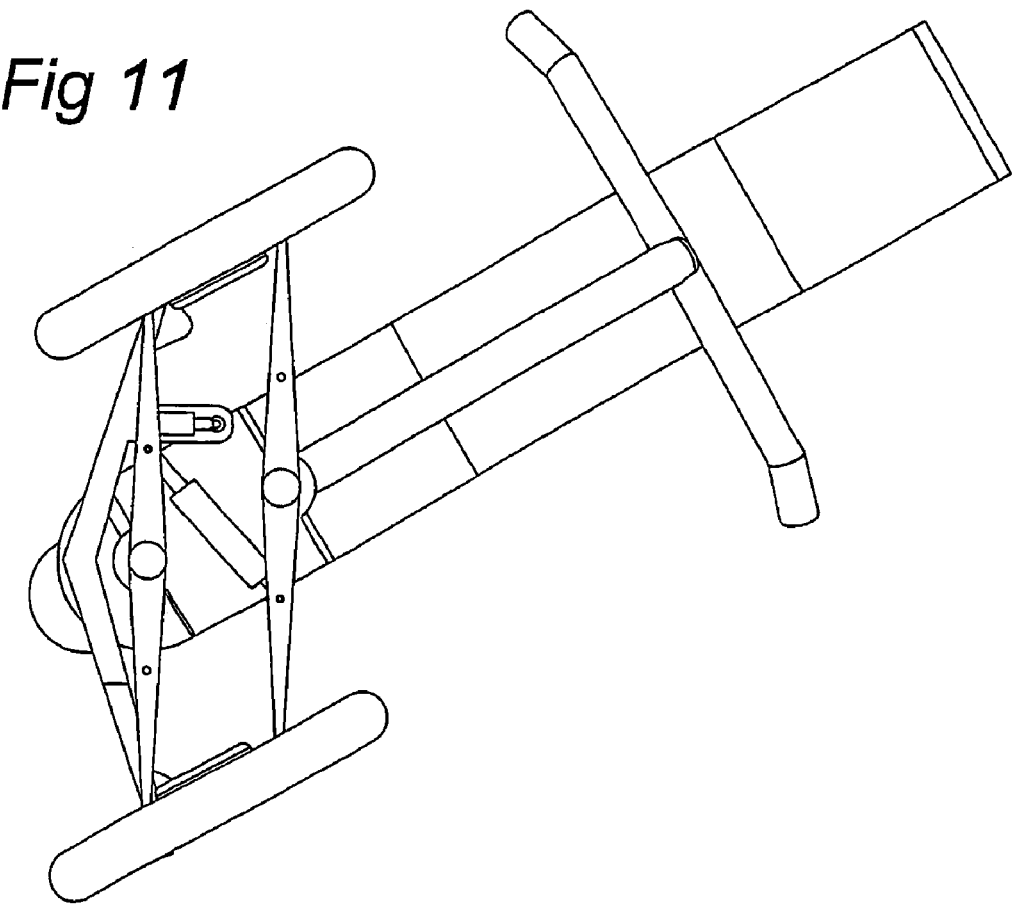
Figure 12:
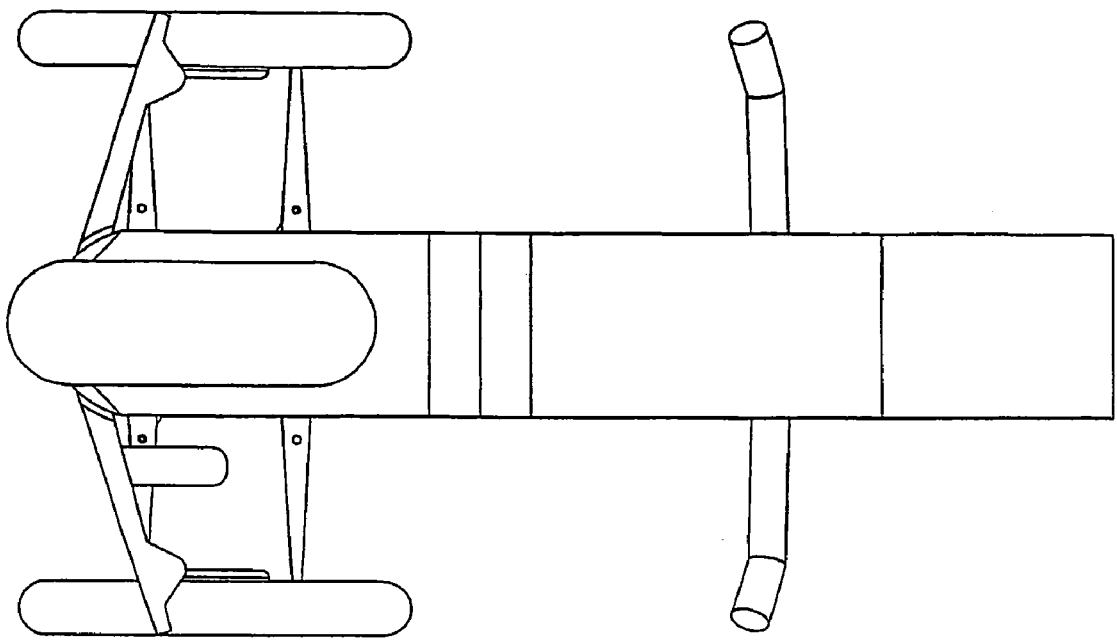
Figure 13:
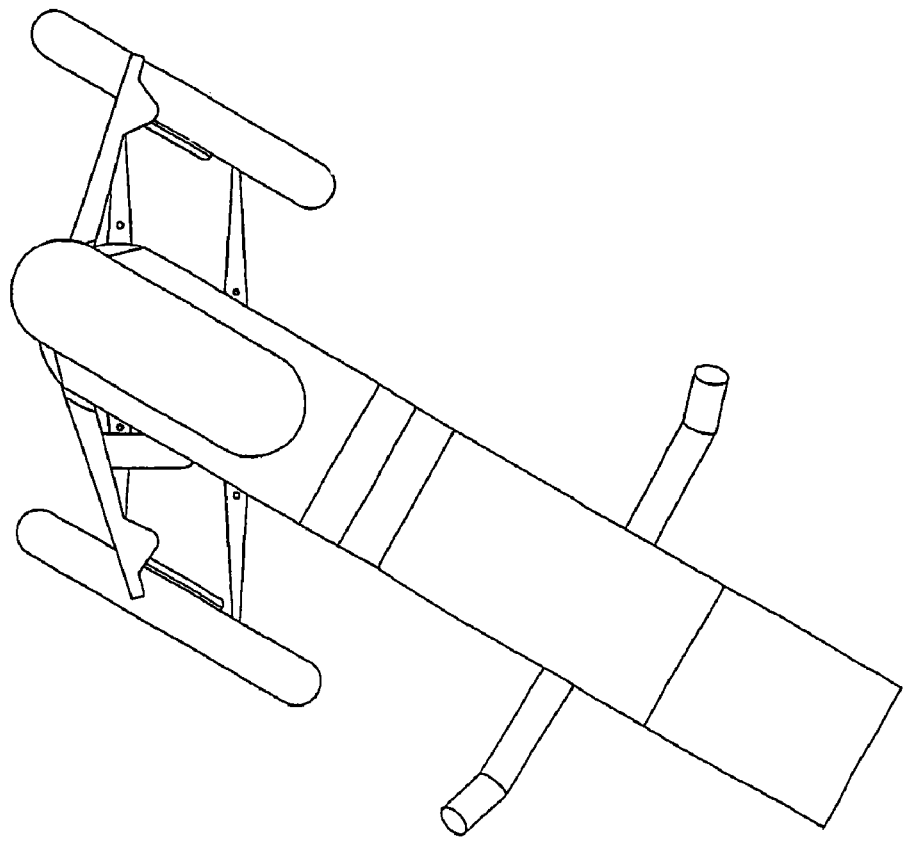
Figure 14:
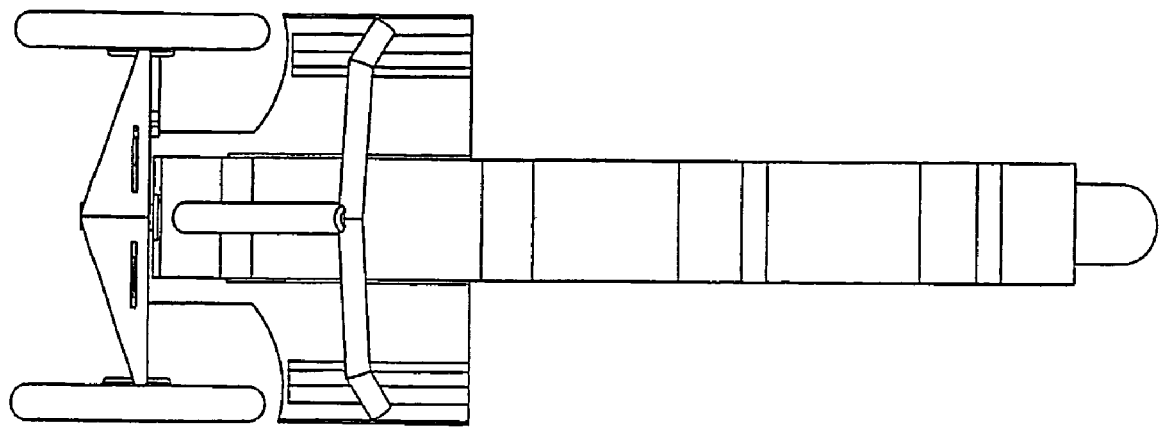
Figure 15:
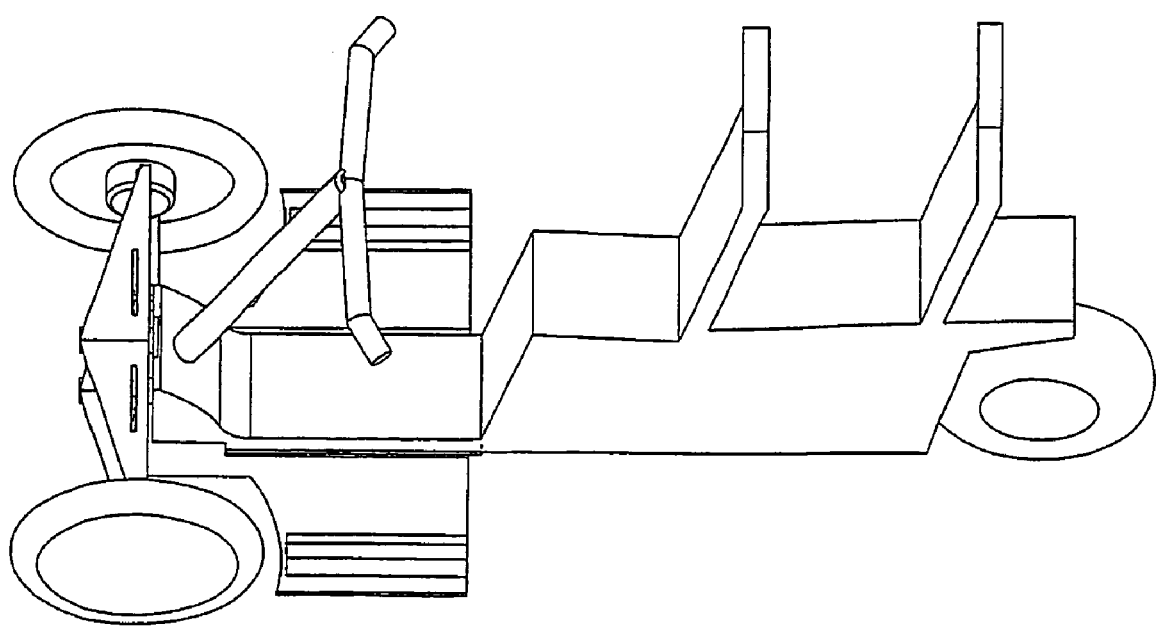
Figure 16:
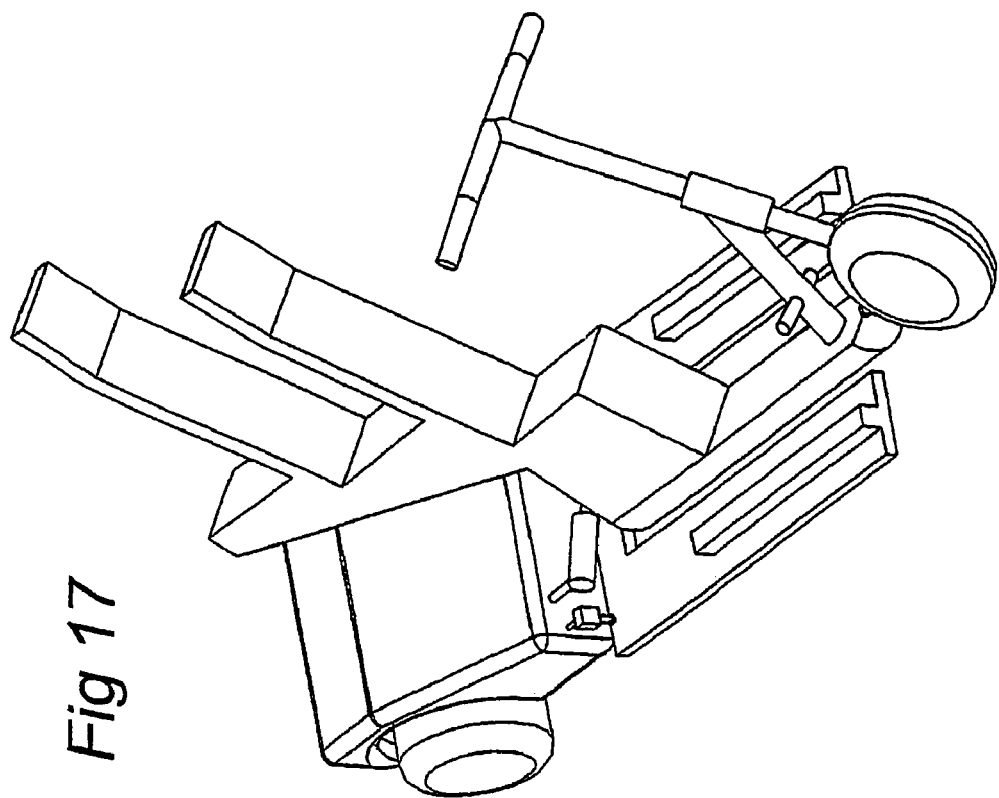
FIGS. 16-29 show a tilting vehicle according to the invention with two rear wheels.
Figure 17:
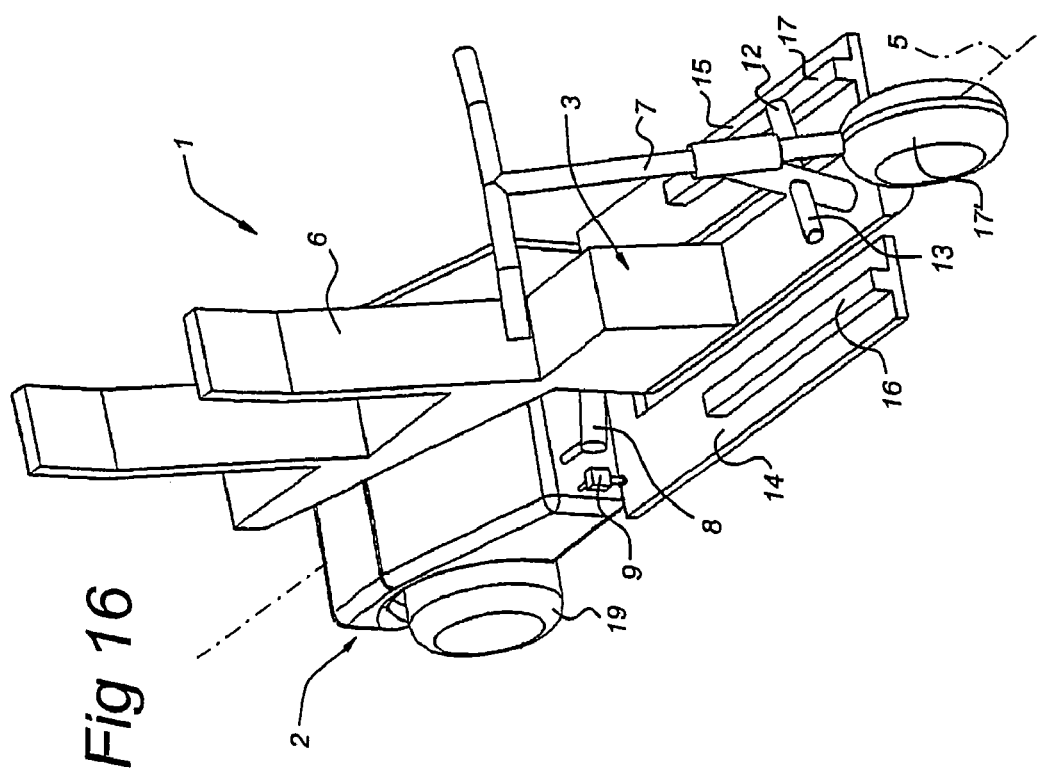
Figure 19:
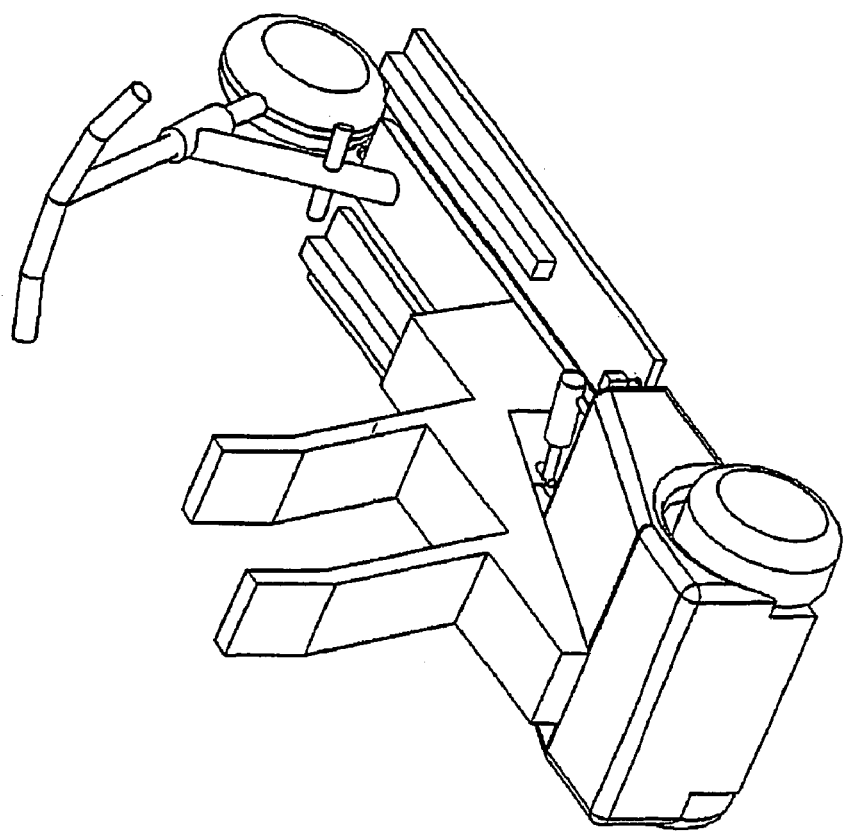
Figure 18:
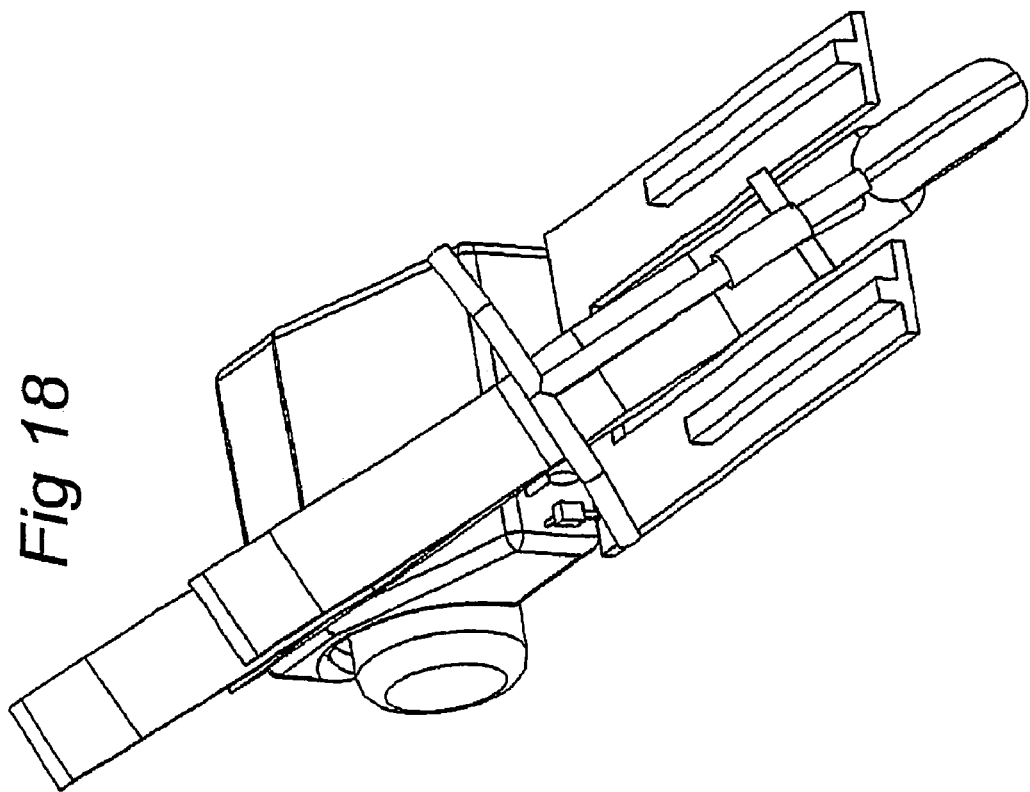
Figure 20:
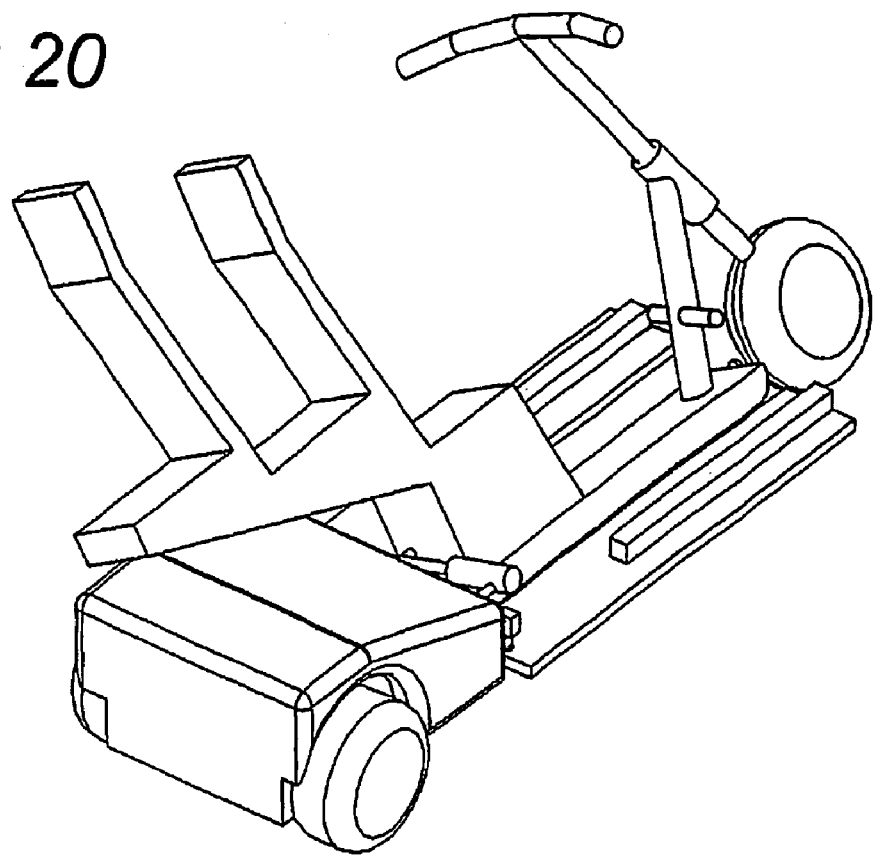
Figure 21:
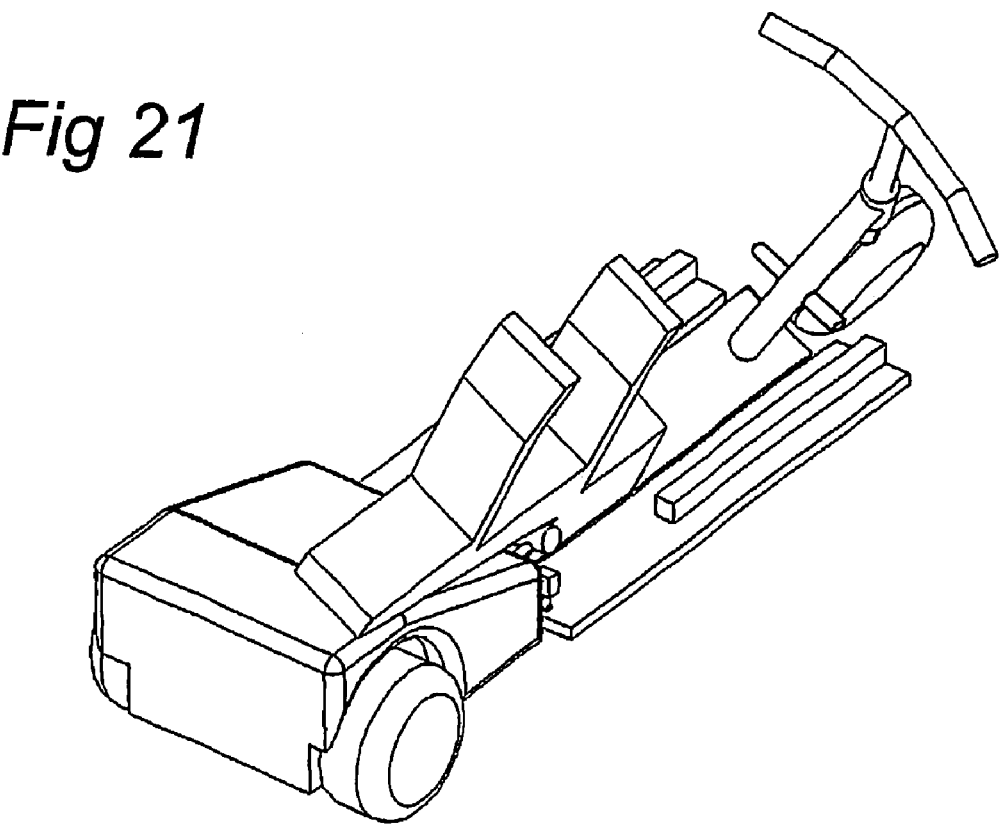
Figure 22:
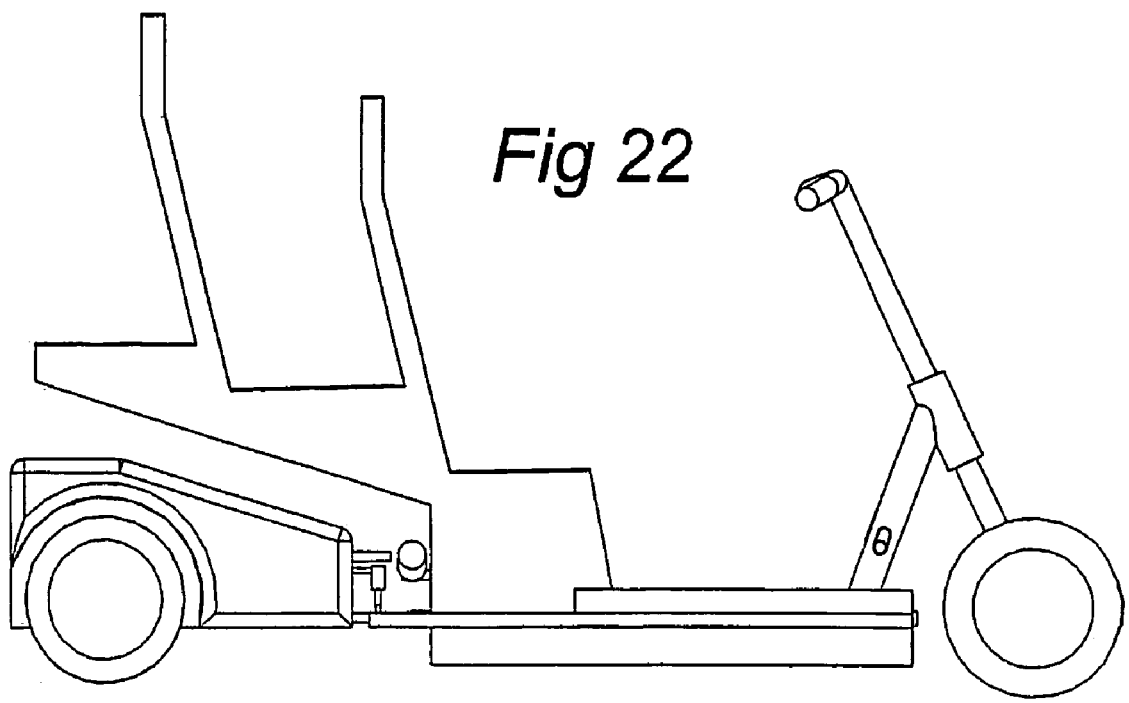
Figure 23:
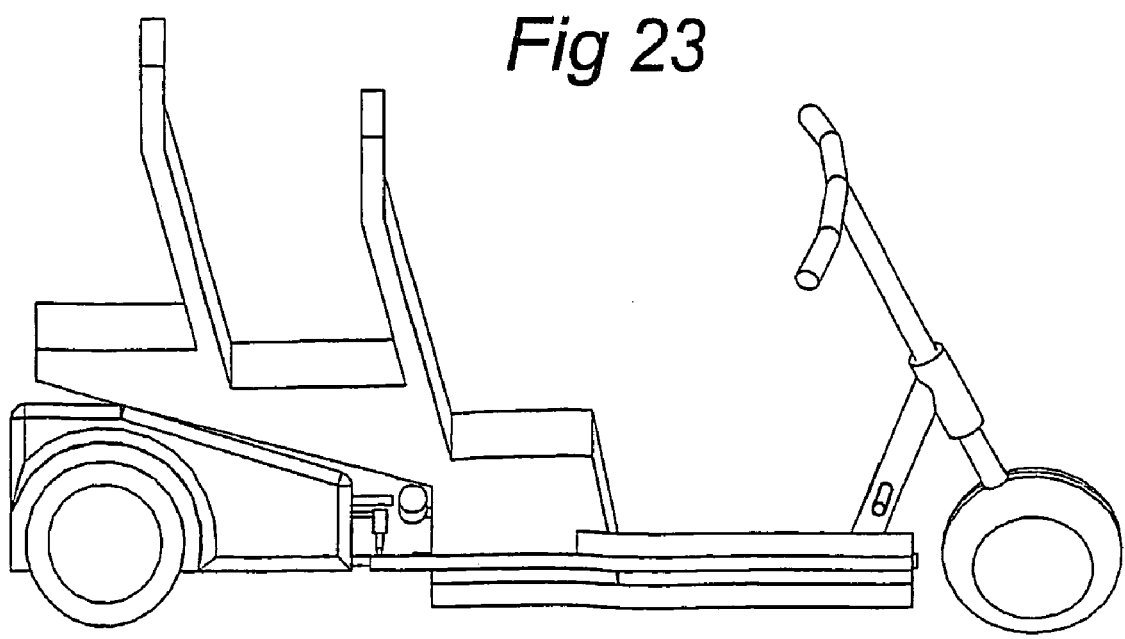
Figure 25:
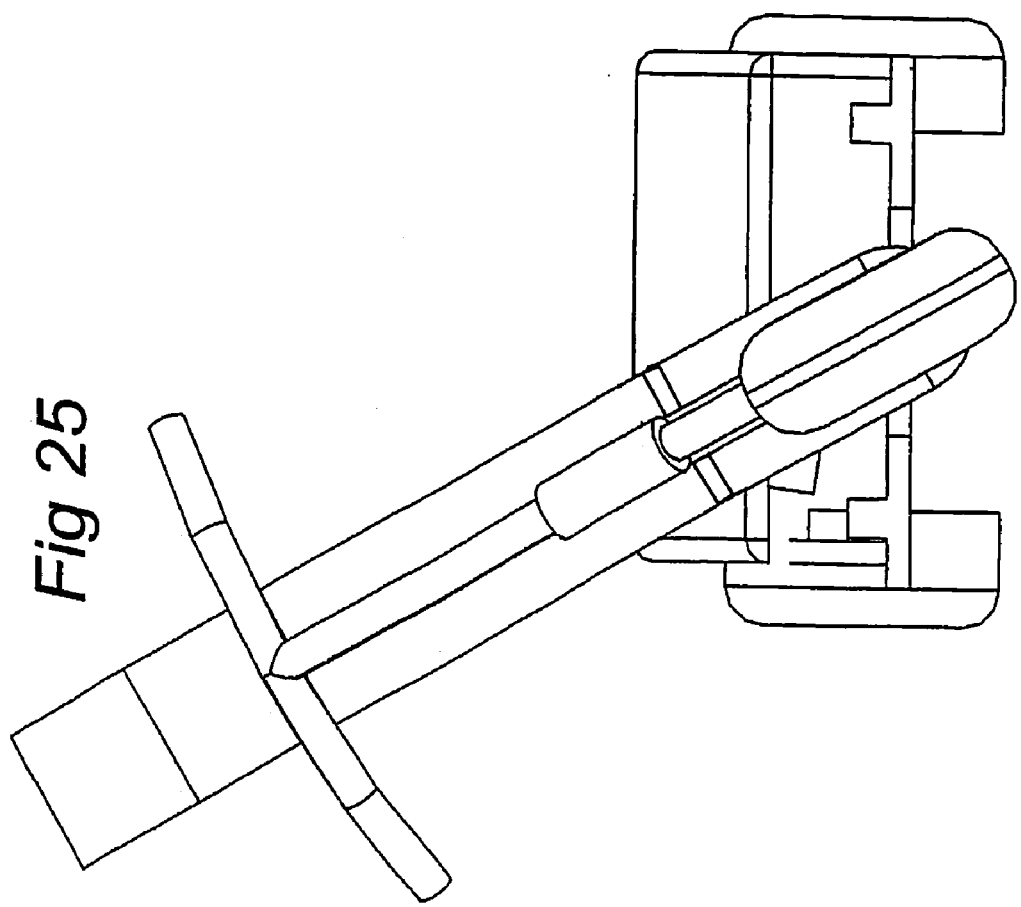
Figure 24:
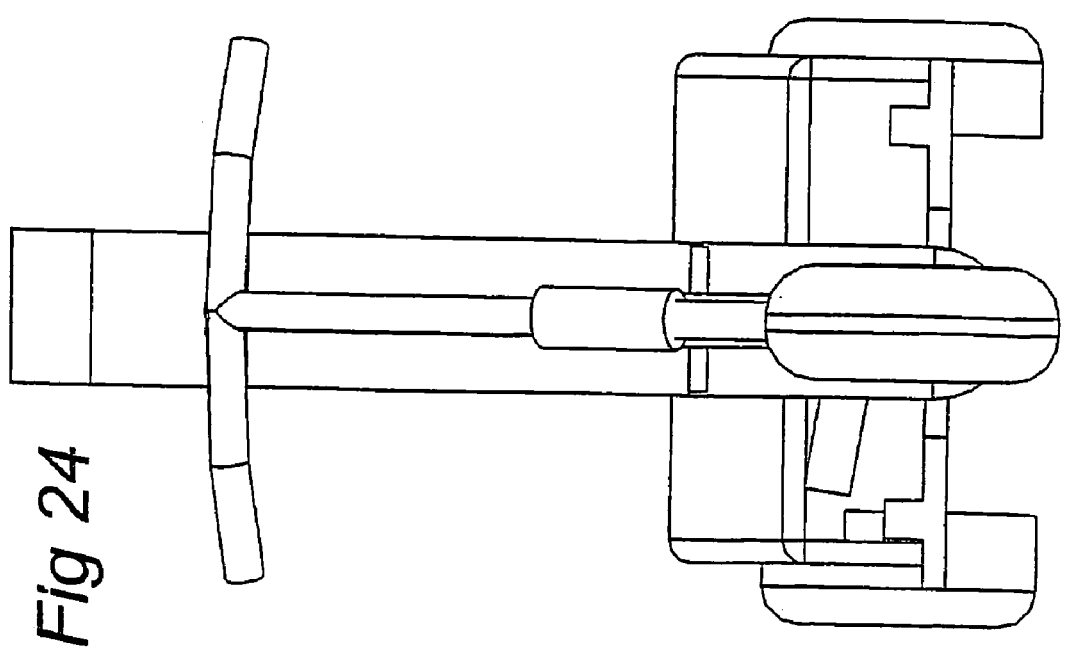
Figure 27:
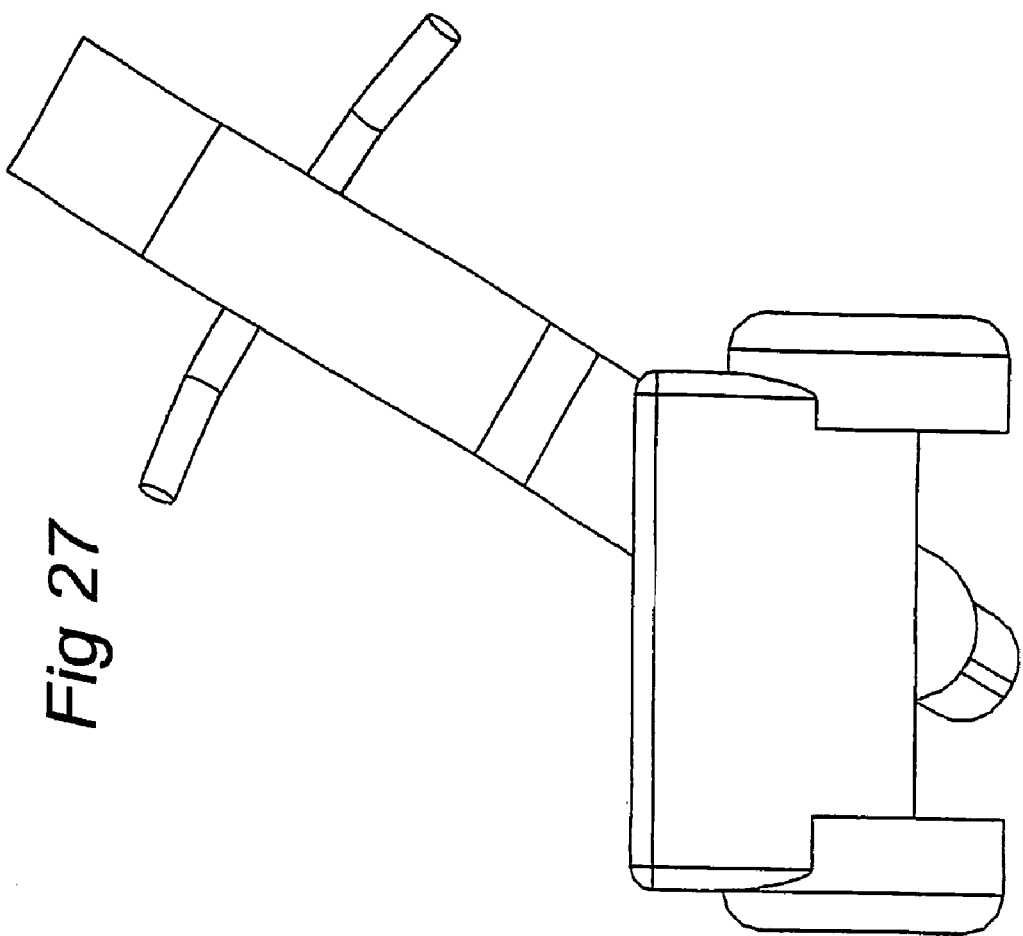
Figure 26:
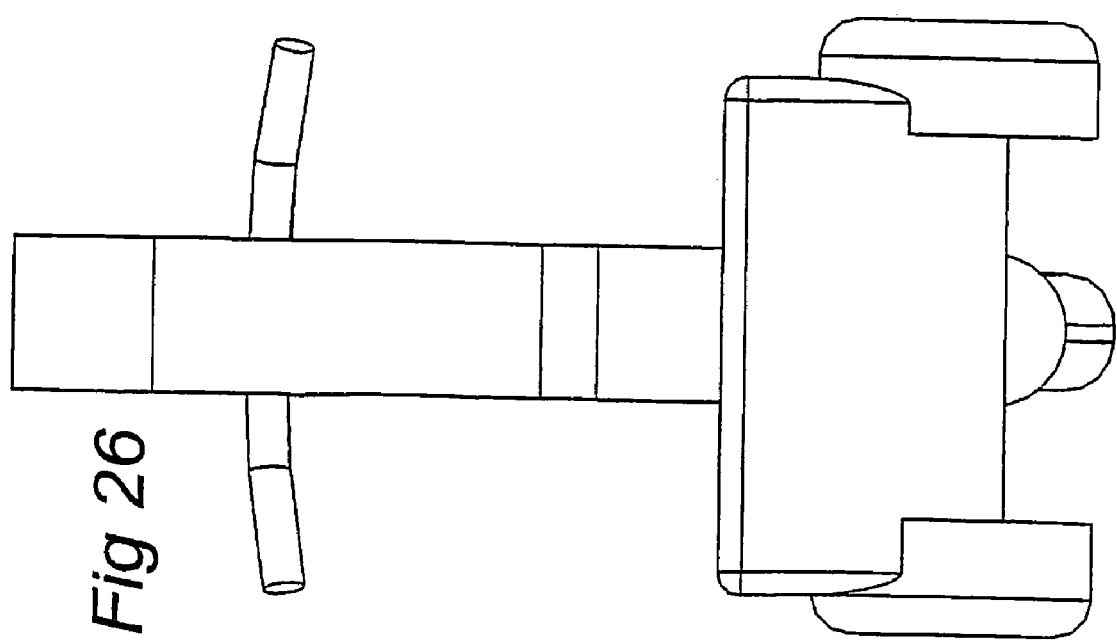
Figure 28:
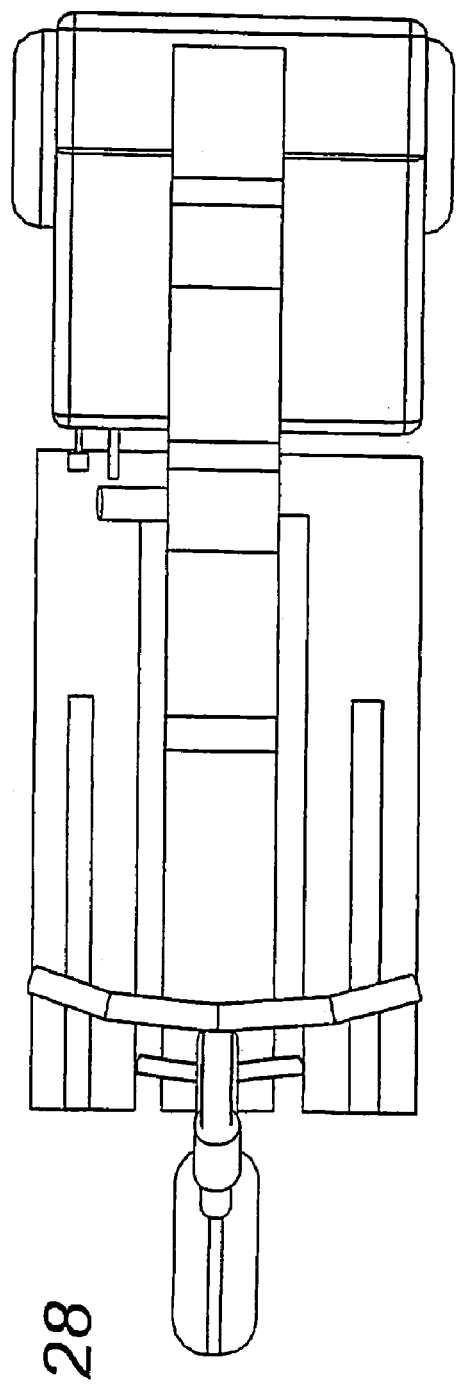
Figure 29:
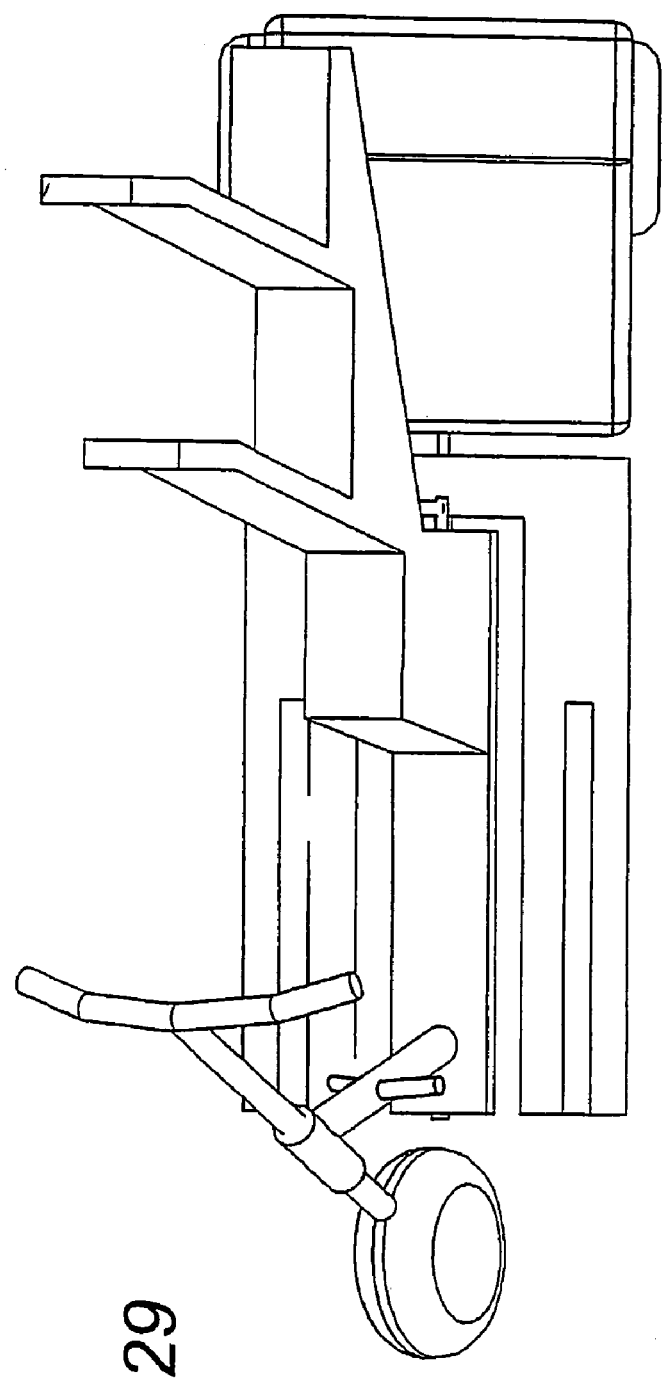

The figures show a vehicle 1 with first frame part 2 and second frame part 3. The frame part 3 can tilt about tilting axis 5 and comprises driver's seat 6 and steering 7. A tilting member 8, such as a hydraulic cylinder, connects the two frame parts 2 and 3. The tilting member 8 is controlled by sensor 9, which measures a tilting position of the second frame part 3 relative to the first frame part 2, or determines a force or moment that a driver exerts on the first frame part 2. The tilting member 8, under the control of the sensor 9, can reinforce or slow down or limit the tilting initiated by the driver. The cylinder 8 can operate continuously, but it is also possible to switch on the cylinder only at a predetermined tilting position, a predetermined force on the tilting parts and/or a predetermined speed of the tilting vehicle.

In order to allow the feet to be rested comfortably during travel, the vehicle 1 is provided with two footrests 12, 13.

During the negotiation of bends the driver can place his feet on the footboards 14, 15. These footboards are provided with raised edges 16, 17 on which the rider can place his feet and against which a lateral force can be exerted during the tilting. The foot can roll along the edges 16, 17 during the tilting, in order to limit the twisting of the ankle joints. The vehicle 1 according to the embodiment shown has three wheels 17, 18, 19, of which the front wheels remain horizontal.

In the embodiment according to FIGS. 16-29 a single tilting wheel is present, while the two rear wheels remain horizontal.

Figure 30:
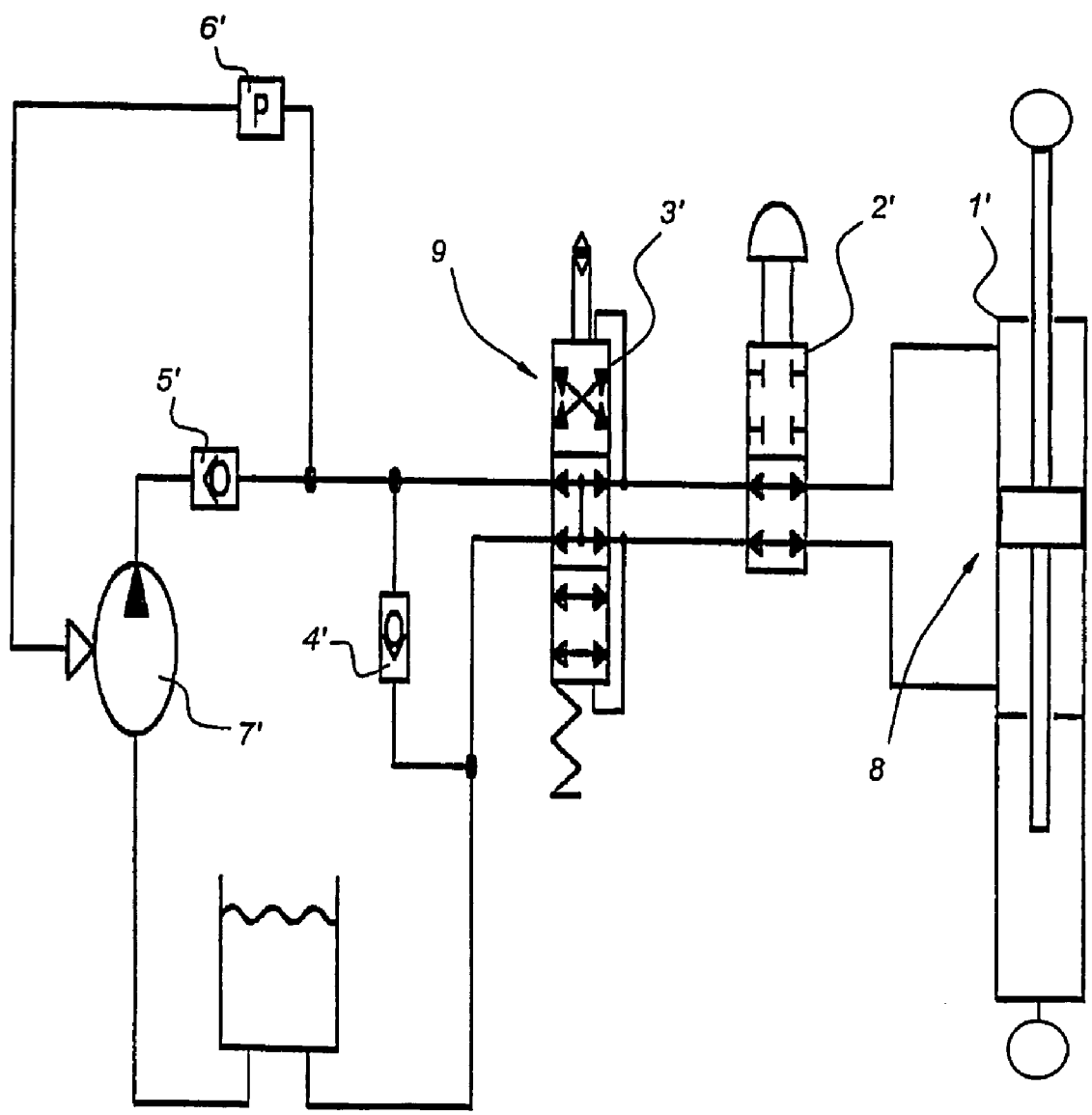
FIG. 30 shows a hydraulic diagram of the tilting member and of a pressure-regulating valve for building up a limiting counter-tilting pressure.

The hydraulic system of cylinder 8 and sensor 9 is shown in FIG. 30 and comprises a double-acting cylinder 11, fitted between the tilting part and the non-tilting part, a lock 2', for blocking during stationary periods or parking, a continuously variable pressure-regulating valve 3', a non-return valve 4', which replenishes oil from the tank 10, a non-return valve 5', which prevents the oil from being able to flow back by way of the pump 7', and a pressure switch 6', which switches on the pump 7' when a set pressure is reached, and a pump 7'.

During ordinary riding as a motorcycle the oil in the cylinder 1' can flow freely back and forth by way of the pressure-regulating valve 3', which without power assistance stands in the middle position. If the rider wishes to prevent falling over and exerts a certain force on the regulating slide valve 3', the outflowing oil from the cylinder 1' will be brought in communication with the inlet side of the regulating valve 3'. On account of the two non-return valves 4', 5', pressure will be built up here, and will counteract the movement of the cylinder 1'. Through feedback in the valve 3', the pressure built up is proportional to the force exerted by the driver.

When the pressure built up exceeds a set value, pressure switch 6' will switch on the pump 7'; as a result of which the vehicle can be set upright with power assistance.

In alternative embodiments the switching on of the pump can be regulated by a sensor that measures the driver force (possibly integrated with regulating slide valve 3'), or with a switch that can be operated separately by the driver.

A simpler embodiment is possible, in the case of which the system can only slow down and block the movement, but cannot move the vehicle upright with power assistance. In this case the pump 7', pressure switch 6', non-return valve 5' and corresponding conduct parts are omitted.

For parking, a two-way shut-off valve 2' is fitted between the two cylinder lines. This valve can be operated by the rider and prevents further tilting of the vehicle into any tilted position. This makes it possible to park the vehicle on a surface that is not flat.

An operating mechanism can also be fitted on the vehicle, which operating mechanism in conjunction with the shut-off valve 2' blocks the tilting of the vehicle at any angle and ensures that driving off is impeded in the blocked situation by, for example, not letting the engine react while the throttle is operated, or by the fact that the vehicle cannot be put in gear.

An operating mechanism can also be fitted on the vehicle, which operating mechanism in conjunction with the shut-off valve 2' both locks the tilting and also sets the vehicle on handbrake, and in the case of which the removal of power assistance from this operating mechanism releases both the brake and the tilting.

The invention claimed is:

1. A vehicle comprising:
   at least three wheels;
   a first frame part provided with at least two footboards;
   a second frame part connected to the first frame part in such a way as to define an overall longitudinal direction and that the second frame part can tilt about a tilting axis extending in the longitudinal direction;
   said second frame part comprising a control member and a driver's seat;
   a tilting member connected to the first frame part and to the second frame part, in order to exert at least one of a tilting force and a moment of force upon the second frame part on the basis of a control signal;
   a sensor being connected to the first frame part for measuring a force or a moment exerted by a driver upon a first frame part, said sensor connected to the tilting member and feeding the control signal to the tilting member; and
   footrest members provided on the second frame part near a lower part of the control member, situated above a height of the footboards.

2. The tilting vehicle (1) as claimed in claim 1, wherein a blocking mechanism is present for locking of the second frame part in one of i) a tilted position and ii) an upright position in a stationary vehicle, and with a drive-off blocking mechanism so that the vehicle cannot be driven off if the blocking mechanism is blocking the second frame part.

3. The vehicle as claimed in claim 2, wherein the drive-off blocking comprises a brake.

4. The tilting vehicle (1) as claimed in claim 1, wherein a tilting of the second frame part (3) from a tilted position to an upright position can take place with little resistance from the tilting element (8).

5. The vehicle according to claim 1, wherein the first frame part is provided with at least two wheels.

6. The vehicle as claimed in claim 1, wherein a part of the first frame part, the footrest positions (14, 15) of the first frame part (2), is situated at a virtually fixed distance of the wheels of the vehicle from a carriageway.

7. The tilting vehicle (1) as claimed in claim 1, wherein the tilting element (8) generates a tilting force that is directed in an opposite direction to a tilting caused by a driver.

8. The tilting vehicle (1) as claimed in claim 1, wherein the control signal blocks the tilting element (8) when a predetermined tilted position has been reached by the second frame part (3).

9. A vehicle comprising:
   at least three wheels;
   a first frame part provided with at least two footboards;
   a second frame part connected to the first frame part in such a way as to define an overall longitudinal direction and that the second frame part can tilt about a tilting axis extending in the longitudinal direction;
   said second frame part comprising a control member and a driver's seat;
   a tilting member connected to the first frame part and to the second frame part, in order to exert at least one of a tilting force and a moment of force upon the second frame part on the basis of a control signal; and
   a sensor connected to the first frame part for measuring a force or moment exerted by a driver upon the first frame part, said sensor connected to the tilting member and feeding the control signal to the tilting member;
   wherein, in use, the tilting member exerts a force upon the second frame part that is directed towards a first side of the vehicle, which first side lies opposite the side of the vehicle on which the footboard on the first frame part on which a pushing force is exerted by the rider is situated.

10. The vehicle as claimed in claim 9, wherein the tilting member exerts a force upon the second frame part that is opposed in direction to a force exerted by external circumstances upon the second frame part.

11. The vehicle as claimed in claim 9, wherein the tilting member exerts little or no force in the direction opposite to the direction of external force or the pushing force.

12. The vehicle as claimed in claim 10, wherein the tilting member exerts little or no force in the direction opposite to the direction of external force or the pushing force.

13. The vehicle according to claim 9, wherein the first frame part is provided with at least two wheels.

14. The vehicle as claimed in claim 9, wherein a part of the first frame part, the footrest positions (14, 15) of the first frame part (2), is situated at a virtually fixed distance of the wheels of the vehicle from a carriageway.

15. The tilting vehicle (1) as claimed in claim 9, wherein the tilting element (8) generates a tilting force that is directed in an opposite direction to a tilting caused by a driver.

16. The tilting vehicle (1) as claimed in claim 9, wherein the control signal blocks the tilting element (8) when a predetermined tilted position has been reached by the second frame part (3).

17. A vehicle comprising:
    at least three wheels;
    a first frame part that is provided with at least two footboards;

a second frame part that is connected to the first frame part in such a way as to define an overall longitudinal direction and that the second frame part can tilt about a tilting axis extending in the longitudinal direction;

said second frame part comprising a control member and a driver's seat;

a tilting member connected to the first frame part and to the second frame part, in order to exert at least one of i) a tilting force and ii) a moment of force upon the second frame part on the basis of a control signal; and a sensor connected to the first frame part for measuring a force or moment exerted by a driver upon a first frame part, said sensor connected to the tilting member and feeding the control signal to the tilting member, wherein the footboards are each provided with a relatively narrow raised edge against which a rider can rest his foot in a lateral direction.

18. The vehicle according to claim 17, wherein the first frame part is provided with at least two wheels.

19. The vehicle as claimed in claim 17, wherein a part of the first frame part, the footrest positions (14, 15) of the first frame part (2), is situated at a virtually fixed distance of the wheels of the vehicle from a carriageway.

20. The tilting vehicle (1) as claimed in claim 17, wherein the tilting element (8) generates a tilting force that is directed in an opposite direction to a tilting caused by a driver.

* * * * *

UNITED STATES PATENT AND TRADEMARK OFFICE
CERTIFICATE OF CORRECTION

PATENT NO.       : 7,600,596 B2                                                    Page 1 of 1
APPLICATION NO. : 10/522816
DATED            : October 13, 2009
INVENTOR(S)      : Van Den Brink et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 854 days.

Signed and Sealed this

Fifth Day of October, 2010

David J. Kappos
*Director of the United States Patent and Trademark Office*